(12) United States Patent
Kolesnikov

(10) Patent No.: US 8,923,519 B2
(45) Date of Patent: Dec. 30, 2014

(54) METHOD OF EFFICIENT SECURE FUNCTION EVALUATION USING RESETTABLE TAMPER-RESISTANT HARDWARE TOKENS

(75) Inventor: Vladimir Kolesnikov, Jersey City, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 1493 days.

(21) Appl. No.: 12/455,193

(22) Filed: May 29, 2009

(65) Prior Publication Data

US 2010/0306543 A1 Dec. 2, 2010

(51) Int. Cl.
| | |
|---|---|
| *H04L 9/08* | (2006.01) |
| *H04L 9/32* | (2006.01) |
| *H04L 9/00* | (2006.01) |
| *G06F 21/60* | (2013.01) |
| *H04L 9/06* | (2006.01) |

(52) U.S. Cl.
CPC ............ *G06F 21/606* (2013.01); *H04L 9/0662* (2013.01); *H04L 9/0897* (2013.01); *H04L 9/3234* (2013.01); *H04L 9/3271* (2013.01); H04L 2209/50 (2013.01)
USPC ............................ 380/283; 713/171; 380/277

(58) Field of Classification Search
USPC ............................... 455/411; 705/12; 380/283
See application file for complete search history.

(56) References Cited

U.S. PATENT DOCUMENTS

| | | | | |
|---|---|---|---|---|
| 6,195,433 | B1* | 2/2001 | Vanstone et al. | 380/285 |
| 2002/0136407 | A1* | 9/2002 | Denning et al. | 380/258 |
| 2002/0194389 | A1* | 12/2002 | Worley et al. | 709/310 |
| 2004/0076291 | A1* | 4/2004 | Geiringer | 380/28 |
| 2005/0130627 | A1* | 6/2005 | Calmels et al. | 455/411 |
| 2008/0266055 | A1* | 10/2008 | Turner et al. | 340/10.1 |

(Continued)

OTHER PUBLICATIONS

Yehuda Lindell et al; A Proof of Security of Yaoa s Protocol for Two-Party Computation; Journal of Cryptology; Dec. 9, 2008; pp. 161-188; vol. 22, No. 2; Springe-Verlag, NE.

(Continued)

*Primary Examiner* — Krista Zele
*Assistant Examiner* — Margishi Desai
(74) *Attorney, Agent, or Firm* — Carmen Patti Law Group, LLC

(57) ABSTRACT

An embodiment of the present invention provides a computer implemented method for the transfer of private information of one user to another user—a primitive known as Oblivious Transfer. An output from a strong pseudorandom function generation (SPRFG) is calculated by a first user's computing module based on first and second parameters: the first parameter specifying one of two secret keys; the second parameter being a value selected within the domain of the SPRFG by the first user. The first user is prevented from reading or learning the stored two secret keys. The output is transmitted to a computer of a second user which generates first and second encrypted values that are each based on an inverse SPRFG calculation using the first and second secret keys, respectively, and corresponding private values of the second user. The encrypted values are sent to a first computer of the first user that calculates one of the private values using a mathematical computation based on the second parameter and the one of the first and second encrypted values that corresponds to the one of the first and second key used.

18 Claims, 3 Drawing Sheets

(56) References Cited

U.S. PATENT DOCUMENTS

| | | | |
|---|---|---|---|
| 2009/0070595 A1* | 3/2009 | Delia et al. | 713/189 |
| 2009/0207985 A1* | 8/2009 | Cioffi et al. | 379/93.01 |
| 2009/0296928 A1* | 12/2009 | Matsumoto et al. | 380/46 |
| 2010/0166041 A1* | 7/2010 | Michaels et al. | 375/141 |
| 2010/0232489 A1* | 9/2010 | Watkins | 375/226 |
| 2011/0099605 A1* | 4/2011 | Cha et al. | 726/3 |

OTHER PUBLICATIONS

Jarvinen, Kolesnikov, Sadeghi, Schneider; Embedded SFE: Offloading Server and Network using Hardware Tokens; Lecture Notes on Computer Science; Jan. 28, 2010; pp. 207-221.

XP002598720 Heidelberg Lecture Notes on Computer Science Retrieved from the Internet: URL:http://eprint.iacr.org/2009/591.pdf.

* cited by examiner

METHOD OF EFFICIENT SECURE FUNCTION EVALUATION USING RESETTABLE TAMPER-RESISTANT HARDWARE TOKENS

BACKGROUND

This invention relates to the implementation of the cryptographic primitive Oblivious Transfer, i.e. the transfer of at least one secret string/value held by one party to another party so that the another party can make certain use of the private information without being able to learn the full private information itself. One example of its usage is in secure function evaluation (SFE), a method of function evaluation that provides privacy to parties seeking to compute on their private inputs. The invention more specifically addresses a method by which one of a party's two secret values (keys) is made accessible for calculations made by the other party for use in decrypting encrypted parameters associated with the communication of information between the parties, but where the other party cannot learn the other of the two keys.

SFE implementations have been disclosed, e.g. see "Fairplay—A Secure Two-party Computation System" by D. Malkhi, N. Nisan, B. Pinkas and Y. Sella, USENIX 2004. Two-party general secure function evaluation (SFE) allows two parties to evaluate any function on their respective inputs x and y, while maintaining privacy of both x and y. SFE algorithms enable a variety of electronic transactions, previously impossible due to mutual mistrust of participants. Examples include auctions, contract signing, distributed database mining, etc. As computation and communication resources have increased, SFE has become practical. Fairplay is an implementation of generic two-party SFE with malicious players. It demonstrates the feasibility of SFE for many useful functions, represented as circuits of up to about a million gates. Another example of a SFE protocol implementation is "Y Lindell, B Pinkas, N. Smart, 'Implementing Two-party Computation Efficiently with Security Against Malicious Adversaries', SCN 2008".

The use of a garbled circuit (GC) technique for SFE, especially suited for boolean circuits, is described by Yehuda Lindell and Benny Pinkas, "A Proof of Yao's Protocol for Secure Two-Party Computation", Cryptology ePrint Archive, Report 2004/175, 2004, http://eprint.iacr.org/. One step in the GC technique is the oblivious transfer (OT) of one of the sender's two secret keys to the receiver. This secret key transfer step is normally implemented by public key encryption techniques and is computationally intensive.

SUMMARY OF THE INVENTION

It is an object of the present invention to provide a method for securely transferring information to a receiving party based on usage by the receiving party of one of two keys of the sending party, where the one key is accessible for calculations by the receiver's equipment but where the receiving party cannot learn full private information, and the sender does not learn which part of the private information was transferred. This minimizes computational effort that is typically required to perform such a transfer. It is especially, but not exclusively, suited for transferring information used in decrypting garbled circuit table parameters in an SFE technique.

In an embodiment of the present invention, a tamper-proof token T, generated by the first party, is given for operation to the second party. This embodiment does not rely on the inability of the second party, who may be potentially malicious, to reset token to the original state. Therefore, this embodiment provides security against a class of attackers for which the prior art did not provide security.

An embodiment of the present invention provides a computer implemented method for the transfer of private information. An output from a strong pseudorandom function generator (SPRFG) is calculated by a first user's computing module, e.g. the resettable tamper-proof token given to the first user by the second user, based on first and second parameters: the first parameter used to specify one of two secret keys; the second parameter being a value selected at random within the domain of the SPRFG by the first user. The first user is prevented from reading or learning the stored two secret keys. The output is transmitted to a computer of the second user which generates first and second encrypted values that are each based on an inverse SPRFG calculation using the first and second secret keys, respectively, and a private value of the second user. The encrypted values are sent to a first user's computer that calculates the private value using a mathematical computation based on the second parameter and the one of the first and second encrypted values that corresponds to the one of the first and second key used.

A further embodiment includes an computing apparatus adapted to implement, in general, the above requirements.

DESCRIPTION OF THE DRAWINGS

Features of exemplary implementations of the invention will become apparent from the description, the claims, and the accompanying drawings in which:

DETAILED DESCRIPTION

One aspect of the present invention resides in the recognition that the use of a removable tamper-proof card in the possession of a receiving party containing the secret keys of the sending party can be utilized in a method for processing values, e.g. SFE values, based on the keys can provide acceptable security for data transfer operations while greatly increasing computational efficiency.

Figure 1:
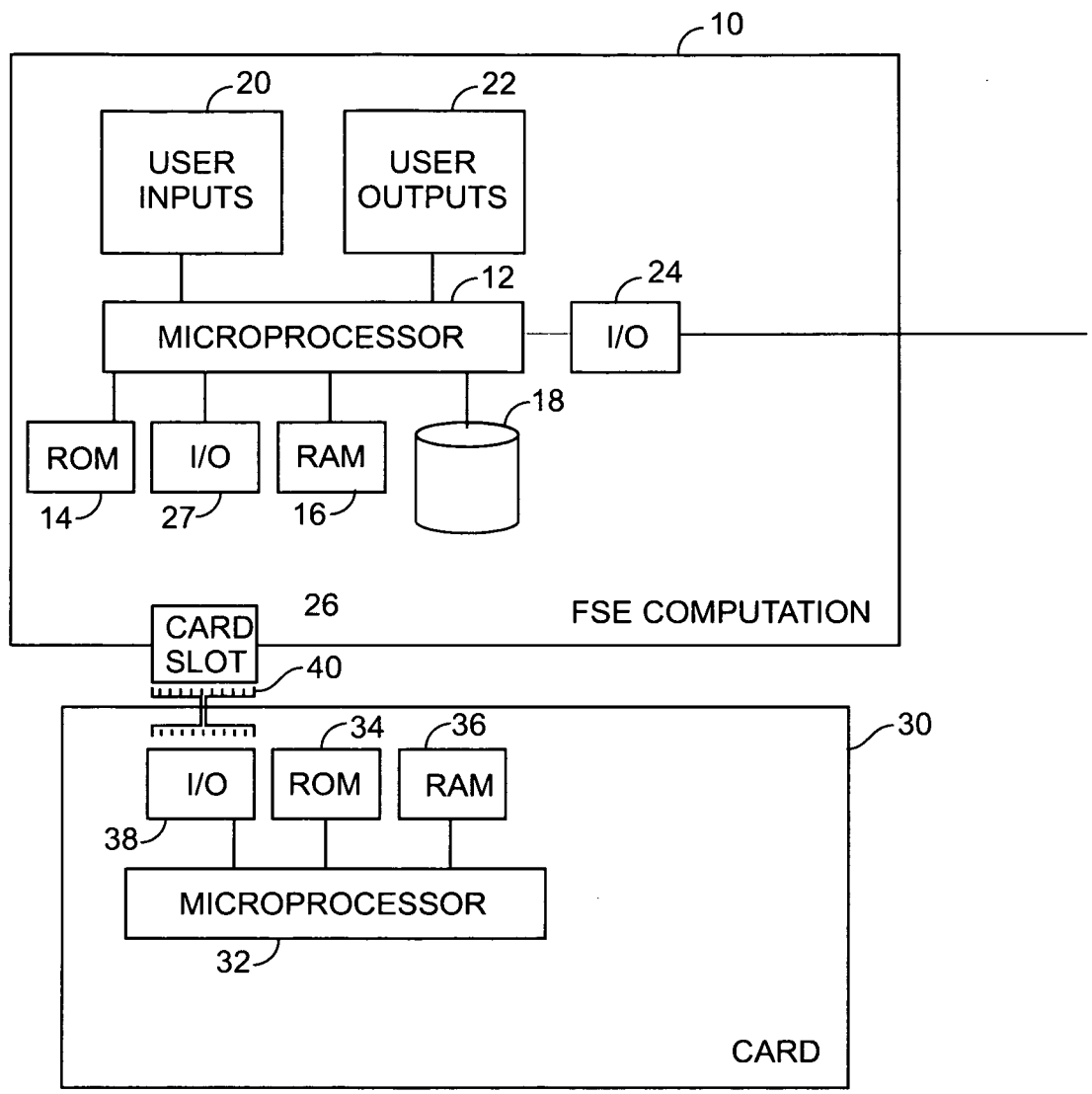
FIG. 1 is a block diagram of an exemplary computing apparatus suited for use by one party for implementing a method in accordance with the present invention.

In FIG. 1, a computing apparatus 10, suitable for implementing an FSE method in accordance with the present invention, includes a microprocessor 12 that performs processes and tasks based on stored program instructions. It is supported by read-only memory (ROM) 14, random access memory (RAM) 16 and nonvolatile data storage device 18. As will be understood by those skilled in the art, data and stored program instructions in ROM 14 is typically utilized by microprocessor 12 to initialize and boot the computing apparatus. An application program, e.g. a program that controls the implementation of the FSE including storing and ungarbling of garbled table values, can be stored in nonvolatile storage element 18. At least active portions of the application program will be typically stored in RAM 16 for ready access and processing by microprocessor 12. A variety of user inputs 20 such as a keyboard, keypad, and mouse can be utilized to input instructions, e.g. FSE inputs and operational control. User output devices 22 such as a display screen and/or printer provide a visual output, e.g. characters, that represent either information input by the user or information associated with an interim or final output of the FSE. An input/output (I/O) module 24 provides a communication interface permitting microprocessor 12 to transmit and receive data with external nodes, e.g. the sending party's apparatus in an FSE exchange where the apparatus 10 is used by the receiving party. A card slot 26, suited to receive and communicate with a removable card 30 in accord with the present invention, is connected to the microprocessor 12 by an input/output module 27.

The removable card 30, in this exemplary implementation, includes a microprocessor 32 coupled to and supported by ROM 34, RAM 36 and I/O module 38. The card 30 includes a plurality of pins 40 associated with I/O module 38 that are designed to engage corresponding contacts associated with card slot 26 when the card 30 is in its inserted position in apparatus 10. Steps, implemented by software in the apparatus 10 and card 30 in accordance with an exemplary method of the present invention, perform the ungarbling of FSE values. The apparatus 10 and card 30 cooperate to execute these steps as explained below.

In one embodiment, this method is implemented by a computer of one party that accesses a token, i.e. a card, which stores but does not reveal the secret key of the other party connected to the one party's computer. Strong pseudorandom function generation (SPRFG) can be used to transfer information from the one party to the other party based on the secret key contained on the token, which may be resettable (i.e. vulnerable to the attacks of a possibly malicious second party aiming to reset the card to its original state). As used herein, "SPRFG" means a pseudorandom function generation (or generator) that allows efficient calculation of the inverse of the function, i.e. from $y=PRFG_k(x)$ and k, one can efficiently compute $PRFG^{-1}_k(y)=x$.

Figure 2:
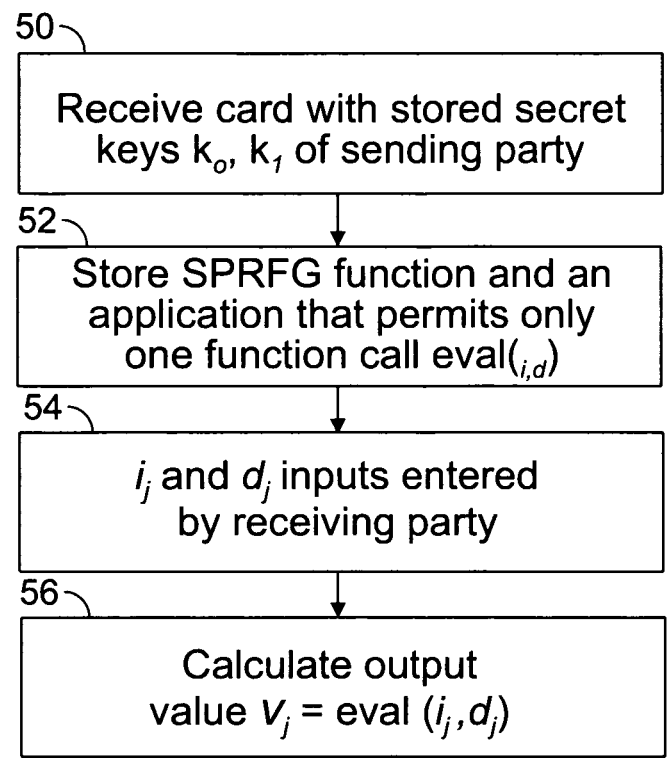
FIG. 2 is a flow diagram of an exemplary method implemented by a removable card in accordance with the present invention.

FIG. 2 shows exemplary steps relating to the operation of card 30. In step 50, two secret keys $k_0$, $k_1$ of the sending party are selected by the sending party, input into the card (the resettable tamper-proof token), and then the card is given to the receiving party. In step 52 a SPRFG function is implemented in the card along with an application that limits the operation (i.e. the interface) of the card to only producing an output in response to a function call eval $(i,d)=PRFG_{k\_i}(d)$, i.e. only the output of the calculation of an eval (i,d) call is accessible from the card. The card is designed to calculate and produce only a single output in response to each function call of eval (i,d), where eval is the evaluate function call, i is the integer 0 (zero) or one (1) as a parameter of the eval function which specifies the one of the two keys is to be utilized, and d is a value input by the receiver. Upon receiving each function call with the associated parameters, the card 30 calculates and outputs a resulting value that represents $SPRFG_{k(i)}(d)$.

In step 54, with the card having been configured as explained above in accordance with steps 50 and 52, it is connected to the computer of the receiving party. Input parameters i and d associated with an eval function call are entered by the receiving party, where d is a random value from the domain of SPRFG and i is as explained above. In step 56 the card 30, in response to receipt of function call request and the input of the associated parameters by the receiving party, calculates a value $v_j=eval(i_j,d_j)$ that represents $SPRFG_{k(i(j))}(d_j)$ and outputs that value to the computer of the receiving party.

Figure 3:
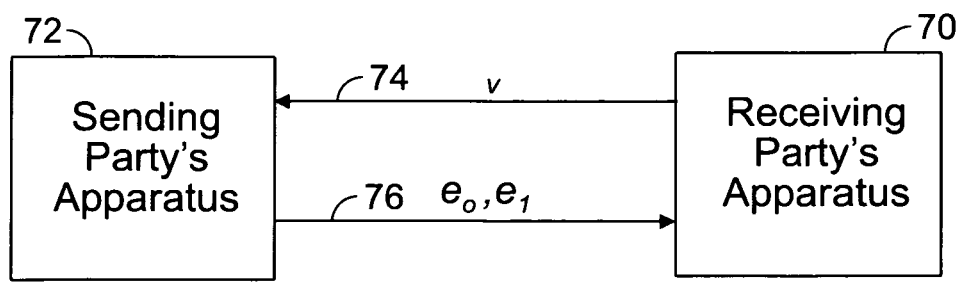
FIG. 3 is a block diagram of an exemplary computing system in which two parties are in communication in accordance with a method of the present invention.

FIG. 3 is a block diagram of an exemplary computing system in which two parties are in communication in accordance with a method of the present invention. A receiving party's apparatus 70, i.e. a computer 10 with card 30, is in communication with the sending party's apparatus 72, i.e. also a computer 10 with a card 30. As explained above, the receiving party's computer, a function call by its computer 10 is processed by the card 30 and the computer 10 receives a corresponding output value v from its card 30. This output v is transmitted to the sending party's apparatus 72 as shown by illustrative path 74. Upon receipt of a value v, the sending party's apparatus 72 computes values $e_0$ and $e_1$, as will be explained in more detail with regard to FIG. 4, and transmits these values as shown by illustrative path 76 to the receiving party's apparatus 70. These values are utilized to decrypt encrypted values by the receiving party's apparatus 70 as further explained in FIG. 5.

Figure 4:
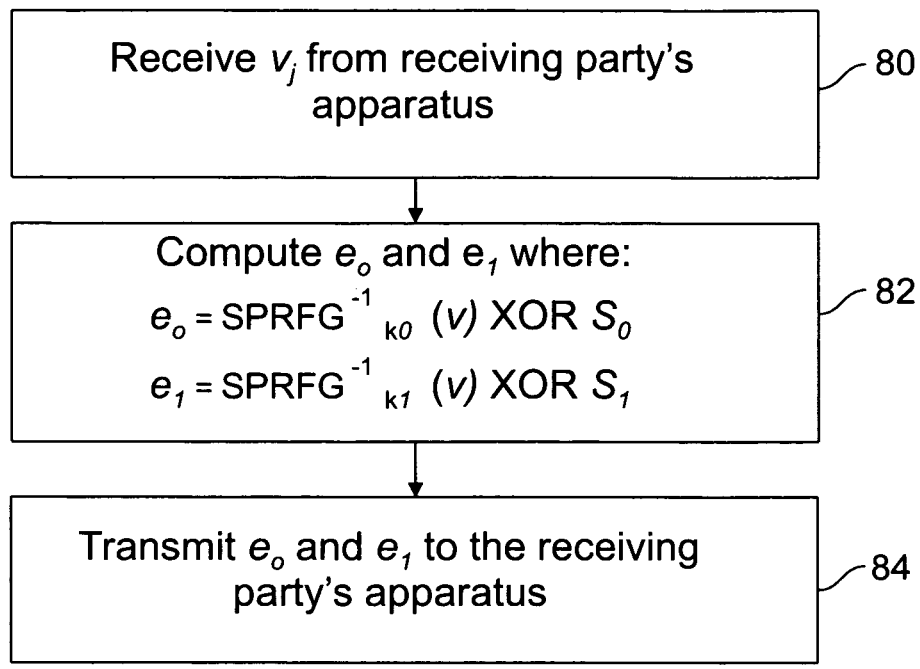
FIG. 4 is a flow diagram of an exemplary method implemented by the computing apparatus of the sending party of FIG. 3 in accordance with the present invention.

FIG. 4 is a flow diagram of an exemplary method implemented by the computing apparatus 72 of the sending party of FIG. 3. In step 80 the sending party's apparatus 72 has received from the receiving party's apparatus 70 a value v. In step 82 the sending party's apparatus 72 computes values $e_0$, $e_1$ defined by:

$$e_0 = SPRF^{-1}_{k0}(v)\ XOR\ s_0$$

$$e_1 = SPRFG^{-1}_{k1}(v)\ XOR\ s_1$$

where $SPRFG^{-1}_{k0}(v)$ and $SPRFG^{-1}_{k1}(v)$ are the inverse PRFG function for v based on the secret keys $k_0$ and $k_1$, respectively, the secret keys having been defined by the sender and hence are known to the sender; XOR represents an exclusive OR function; and $s_0$ and $s_1$ are secret values known to the sender, only one of which (as chosen by the receiver) is desired to the transmitted to the receiver in an encrypted format of values $e_0$, $e_1$. In step 84 the sending party's apparatus 72 transmits values $e_0$, $e_1$ to the receiving party's apparatus 70, which uses these values to decrypt the desired value $s_i$ from the received value $e_i$.

Figure 5:
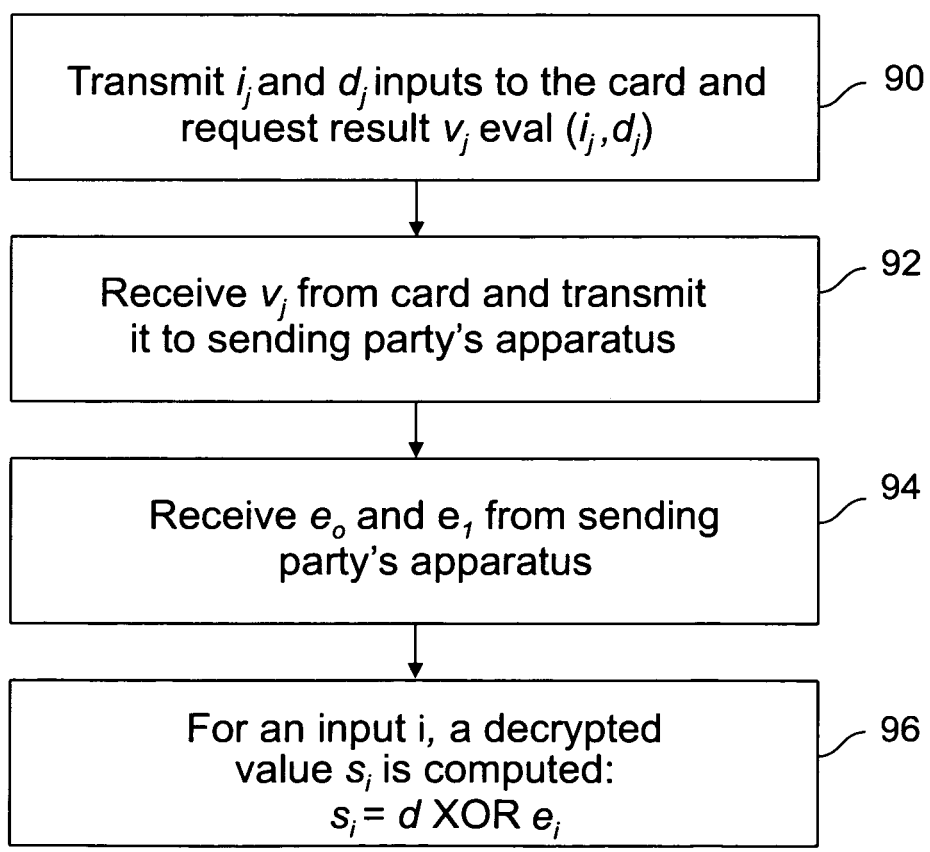
FIG. 5 is a flow diagram of an exemplary method implemented by the computing apparatus of the receiving party of FIG. 3 in accordance with the present invention.

FIG. 5 is a flow diagram of an exemplary method implemented by the computing apparatus of the receiving party of FIG. 3. In step 90 the computer 10 of the receiving party's apparatus 70 makes a function call of its card 30 and transmits $i_j$ and $d_j$ inputs as associated parameters to the card 30 connected to computer 10 of the receiving party's apparatus. In this example, "j" represents values associated with a particular set of values associated with the ultimate determination by the receiving party of a corresponding unencrypted value. A resulting value $v_j$ of the executed function call eval($i_j,d_j$) is computed by the card. In step 92 the value $v_j$ is received from the card by the computer 10 of the receiving party which transmits it to the sending party's apparatus 72. In step 94, the receiving party's apparatus 70 receives the values $e_0$, $e_1$ from the sending party's apparatus 72 that were generated based value $v_j$. In step 96 the receiving party's apparatus 70 calculates an unencrypted value $s_i$ for input $i_j$, where the unencrypted value $s_i$ is computed as follows:

$$s_i = d\ XOR\ e_i$$

where d is the random variable selected by the receiving party from the domain of the SPRFG; XOR is the exclusive OR function; and $e_1$ is the received value from the sending party.

The privacy of the receiver has been maintained with regard to the sender, since the sender is only provided with a single value v that is within the domain of the SPRFG, and could have been generated by i=0 or i=1. The privacy of the sender is maintained with regard to the receiver since the receiver will not be able to obtain a value v such that the receiver knows its preimages under both keys: $SPRFG^{-1}{}_{k0}$ and $SPRFG^{-1}{}_{k1}$. This is because the receiver does not have a way to learn the values of the keys $k_0$ and $k_1$ themselves, and that the card ensures that the receiver can only evaluate the SPRFG function in the "forward" direction, i.e. the card does not permit the receiver access to performing an inverse SPRFG calculation.

A feature of the embodiment of the present invention is that the token T does not keep its state following the calculation of v, and therefore resetting T will not help a malicious receiver, and thus provides enhanced security. This is in contrast with the prior art solutions, which rely on secure execution counters for implementation of the present functionality. Clearly, resetting the prior art card resets its counter and invalidates security assumptions of the prior art solutions.

This method is especially, but not exclusively, suited for use in an SFE which allows the parties to evaluate a function at respective inputs while maintaining the privacy of the inputs. The garbled circuit (GC) approach is an efficient method of SFE for Boolean circuits. A computationally intensive step of the GC of the prior art is the oblivious transfer of one of the two secret keys held by the sender to the receiver.

Although exemplary implementations of the invention have been depicted and described in detail herein, it will be apparent to those skilled in the art that various modifications, additions, substitutions, and the like can be made without departing from the spirit of the invention. Although a removable card 30 has been shown in the above embodiment to permit calculations to be performed using a selected one of two secret keys while prohibiting the values of the keys themselves from being readable (disclosed to) by a user, other structure or devices that support the required functionality could be substituted in place of the removable card 30. For example, a memory module can store the secret keys and be utilized with associated hardware, firmware and/or software which permits secret key access only to another device/module that makes a required computation utilizing the key while prohibiting direct access to the secret keys, i.e. preventing a conventional memory read operation by which the stored secret key values could be directly read and disclosed to the user. Alternatively, a computing module with a USB port interface could be utilized to store the secret keys, support a SPRFG operation based on received inputs, and prohibit direct read access to the stored secret keys from an associated computer connected by the USB port.

The scope of the invention is defined in the following claims.

I claim:

1. A computer implemented method for the transfer of private information comprising the steps of:
   receiving at a first computing module of a first computer of a first user a request to compute a function based on strong pseudorandom function generation (SPRFG) with first and second parameters being associated with the request, where the second parameter is a value selected within the domain of the SPRFG by the first user;
   calculating an output by the first computing module of the SPRFG function based on the first and second parameters, where the first parameter specifies one of two secret keys stored in the computing module that is used in the calculation of the SPRFG function, the first computing module preventing the first user from reading or learning the stored two secret keys;
   transmitting the output to a second computer of a second user;
   receiving, from the second computer, first and second encrypted values that are each based on an inverse SPRFG calculation using the first and second secret keys, respectively, and respective first and second private values of the second user, the secret keys being known to the second user;
   calculating, by a first computer coupled to the computing module, one of the first and second private values using a mathematical computation based on the second parameter and one of the first and second encrypted values.

2. The method of claim 1 wherein the first parameter is input by the user that specifies one of the two secret keys.

3. The method of claim 1 wherein the first and second encrypted values comprise an inverse SPRFG calculation of the output for one secret key and the other secret key, respectively, and exclusively OR'ing each of the inverse SPRFG calculations with corresponding first and second private values.

4. The method of claim 1 wherein the first computing module preventing comprises the first computing module responding only to requests by the first user to compute a function based on strong pseudorandom function generation (SPRFG) with first and second parameters, and providing only the output for access by the first user.

5. The method of claim 1 wherein the first computing module comprises a microcomputing module that is removably connected to the first computer.

6. The method of claim 5 wherein the microcomputing module is a plug-in card that a user inserting into and removes from the first computer.

7. A computer implemented method for the transfer of private information comprising the steps of:
   receiving at a second computer an output calculated by a first computer, the output by the first computer being a function based on strong pseudorandom function generation (SPRFG) based on first and second parameters, where the first parameter specifies one of first and second secret keys stored at the first computer, and the second parameter is a value selected within the domain of the SPRFG by a first user of the first computer;
   calculating first and second encrypted values by the second computer that are based on an inverse SPRFG calculation using the output and the first and second secret keys, respectively, which are known to the second user of the second computer, and are also based respectively on first and second private values of the second user;
   transmitting the first and second encrypted values from the second computer to the first computer that is adapted to decrypt the private value from one of the first and second encrypted values.

8. The method of claim 7 wherein the first parameter is received as an input by the user of the first computer that specifies one of the two secret keys.

9. The method of claim 7 wherein the output is calculated by a first computing module of the first computer, the output being an SPRFG function based on first and second parameters, where the first parameter specifies one of first and second secret keys stored in the computing module that is used in the calculation of the SPRFG function, the first computing module preventing the first user from reading or learning the stored two secret keys, the second parameter being a value selected within the domain of the SPRFG by the first user.

10. The method of claim 7 wherein the first computing module is adapted to prevent the first user from reading or learning the first and second secret keys wherein the first computing module responds only to requests by the first user to compute a function based on SPRFG with first and second parameters, and provides from the first computing module only the output for access by the first user.

11. The method of claim 7 wherein the first computer includes a microcomputing module that is removably connected to the first computer.

12. The method of claim 11 wherein the microcomputing module is a plug-in card that a user inserting into and removes from the first computer.

13. An apparatus for transferring private information comprising:
- a first computing module of a first computer that receives a first user a request to compute a function based on strong pseudorandom function generation (SPRFG) with first and second parameters being associated with the request, where the second parameter is a value selected within the domain of the SPRFG by the first user;
- the first computing module calculates an output of the SPRFG function based on the first and second parameters, where the first parameter specifies one of two secret keys stored in the computing module that is used in the calculation of the SPRFG function, the first computing module preventing the first user from reading or learning the stored two secret keys;
- a transmitter that transmits the output to a second computer of a second user;
- the first computer receiving from the second computer first and second encrypted values that are each based on an inverse SPRFG calculation using the first and second secret keys, respectively, and respectively on first and second private values of the second user, the secret keys being known to the second user;
- the first computer calculating an output value that is a private value of the second user using a mathematical computation based on the first and second parameter and one of the first and second encrypted values.

14. The apparatus of claim 13 wherein the first parameter is received as an input by the user that specifies one of the two secret keys.

15. The apparatus of claim 13 wherein the first and second encrypted values comprise an inverse SPRFG calculation of the output for one secret key and the other secret key, respectively, and exclusively OR'ing each of the inverse SPRFG calculations with respective first and second private values.

16. The apparatus of claim 13 wherein the first computing module responds only to requests by the first user to compute a function based on strong pseudorandom function generation (SPRFG) with first and second parameters, and provides only the output for access by the first user.

17. The apparatus of claim 13 wherein the first computing module comprises a microcomputing module that is removably connected to the first computer.

18. The apparatus of claim 17 wherein the microcomputing module is a plug-in card designed for a user to insert into and remove from the first computer.

* * * * *